(No Model.)
F. F. SCHUMANN.
SASH FASTENER.
No. 412,988. Patented Oct. 15, 1889.
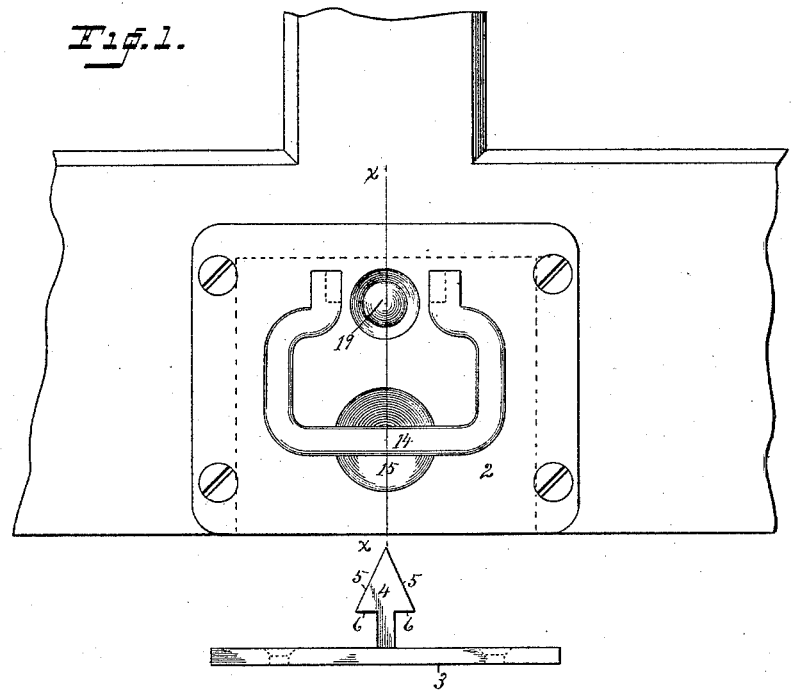
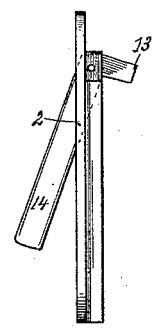 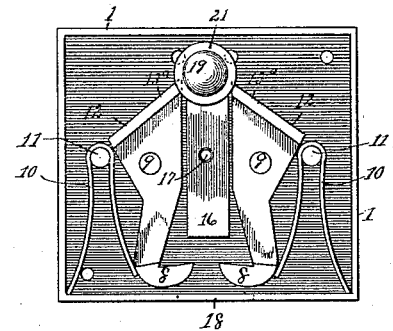
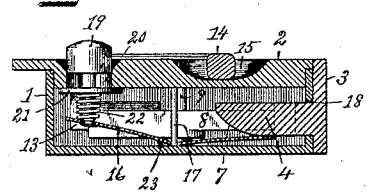 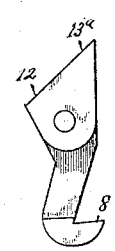 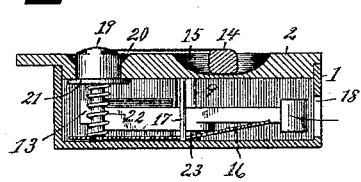
Witnesses
C. M. Newman,
Bertha E. Lee,
Inventor
Ferdinand F. Schumann
By H. M. Wooster,
Atty.

UNITED STATES PATENT OFFICE.

FERDINAND F. SCHUMANN, OF BROOKLYN, NEW YORK.

SASH-FASTENER.

SPECIFICATION forming part of Letters Patent No. 412,988, dated October 15, 1889.

Application filed March 29, 1889. Serial No. 305,229. (No model.)

*To all whom it may concern:*

Be it known that I, FERDINAND F. SCHUMANN, a citizen of the United States, residing at Brooklyn, in the county of Kings and State of New York, have invented certain new and useful Improvements in Sash-Fasteners; and I do hereby declare the following to be a full, clear, and exact description of the invention, such as will enable others skilled in the art to which it appertains to make and use the same.

My invention has for its object to produce an automatic sash-fastener adapted to either upper or lower sashes, but more especially to lower sashes, the special features of construction being that the sash is readily locked in place by the engagement of locking-catches with a stump, and that said catches can only be operated to release the sashes by manipulation of special mechanism, the parts being few in number, and the construction simple and practically impossible to get out of repair.

With these ends in view I have devised the novel construction which I will now describe, referring by numbers to the accompanying drawings, forming part of this specification, in which—

Figure 1 is an elevation of a portion of a lower sash, showing my novel fastener in operative position thereon, and also showing the stump detached therefrom, said stump in use being attached to the lower sill under the sash; Fig. 2, an edge view of the face-plate of the case, the finger-piece being swung outward, as in the act of unlocking; Fig. 3, an elevation of the case, showing the operative parts in position, the face-plate being removed; Fig. 4, a section on the line $x\ x$ in Fig. 1, the stump being, however, shown as engaged by the locking-catches; Fig. 5, a similar view, the stump being removed and the parts in the same position as in Fig. 3; and Fig. 6 is a view of one of the locking-catches detached.

1 denotes the case, and 2 the face-plate, which is secured thereto in the ordinary or any preferred manner. The case in practice is mortised into the sash, where it is secured by screws, as is clearly shown in Fig. 1. The locking mechanism upon the sill consists of a keeper-plate 3, having a stump 4, which is adapted to be engaged by the locking-catches and to engage the spring locking-plate, as will presently be explained. This stump in front elevation is spear-shaped, the sides consisting of inclines 5, which meet at the apex. Below the inclines are shoulders 6, which are engaged by the locking-catches to lock the sash. The back of the stump consists of an incline 7, which also terminates at the apex, as is clearly shown in Fig. 4.

The locking mechanism within the case consists of two bevel-nosed locking-catches 8, pivoted as at 9. These locking-catches are held at their normal—that is, their locking—position by means of springs 10, said springs and the studs 11, by which they are held, serving as stops to limit the inward movement of the locking-catches, so that they are held firmly in place. At the upper ends of the locking-catches are inclined shoulders 12, which in operation are engaged by lugs 13 upon finger-piece 14. This finger-piece may be of any suitable shape, and preferably lies in a correspondingly-shaped groove in the face-plate, as indicated in Figs. 1 and 4. A recess 15 is formed in the face-plate in order to give convenient access to the finger-piece when it is desired to raise the sash. The finger-piece is pivoted near the upper edge of the face-plate in such a manner as to permit its lower end to swing outward, as in Fig. 2. Lugs 13 at the upper ends of the finger-piece project through the face-plate in position to engage the inclined shoulders 12 upon the locking-catches within their pivotal points, so that when the finger-piece is swung outward, as in Fig. 2, lugs 13 are caused to engage inclines 12 at about the points marked $13^a$, the effect being to throw the upper ends of the locking-catches inward, and consequently to throw their lower ends outward, thereby disengaging them from the stump. 16 is a spring locking-plate which lies between the locking-catches, and is held in position by a pin 17, which passes loosely through it and is secured in the opposite side plates of the case. The ends of this locking-plate are normally curved upward, the central portion of the back resting against the back of the case at all times. In the lower edge of the case I provide an opening 18, which is adapted to receive stump 4 in the act of locking—that is to say, when the sash is forced down upon the sill. As the sash is forced to the locked position, stump 4 will enter the case through the opening and engage the beveled noses of the locking-catches, inclines 5 upon the sides of the stump acting to press said catches outward away from each other against the power of springs 10 until the noses of the locking-catches shall have passed over shoulders 6 upon the stump, the springs then acting to throw the catches inward to their normal position, thereby holding the sash securely locked. It will be seen, furthermore, that as stump 4 passes into the case to the locking position incline 7 on the back thereof will engage the lower end of the spring locking-plate and press it down, as is clearly shown in Fig. 4, thereby raising the upper end thereof, so that it lies between the straight inner sides of the upper ends of the locking-catches, thus making it impossible to disengage the locking-catches from the stump until the spring locking-plate has been pressed downward out of the way, to permit the upper ends of said catches to move inward toward each other.

19 denotes a push-pin which projects through an opening 20 in the face-plate, and the lower end of which is loosely riveted to the upper end of the spring locking-plate.

21 is a washer through which the shank of the push-pin passes, and which is larger than opening 20, so as to rest upon the inner side of the face-plate, and 22 is a spring surrounding the push-pin and bearing against the washer and the spring locking-plate, as is clearly shown in Figs. 4 and 5. When stump 4 passes into the case, raising the upper end of the locking-plate, as in Fig. 4, the spring is compressed and the push-pin thrown slightly above the face of the locking-plate. The opening 20, through which the push-pin passes, is preferably countersunk upon the outer side, as shown.

In practice I ordinarily place washers 23 under the locking-catches, which hold them slightly away from the back plate of the case.

In order to unlock the sash when the locking-catches are once engaged with the stump, two movements are necessary, although both may readily be performed with one hand.

The operation of unlocking is ordinarily as follows: The push-pin is pressed in with either the first or second finger, and the finger-piece is lifted outward with the thumb. The effect of forcing in the push-pin is to press the upper end of the locking-spring downward, so that the locking-catches may be swung inward over it. The disengagement of the locking-catches is effected when the finger-piece is swung outward by the engagement of lugs 13 with the inclined shoulders 12. The sash is locked by simply pressing it down to place, stump 4 acting to throw the catches outward and springs 10 to force them inward again under shoulders 6. The movement of the finger-piece being an upward as well as an outward movement in the act of unlocking, it follows that the sash will be carried upward as soon as the locking-catches are detached from the stump, without using the other and without change of position.

The details of construction may of course be varied within reasonable limits without departing from the principle of my invention.

I claim—

1. In a sash-lock, the combination, with a bevel-nosed stump adapted for attachment to a window-sill, of pivoted locking-catches upon the sash, springs acting to throw said catches to the locked position, and a swinging finger-piece having lugs projecting inward and acting when said finger-piece is swung outward to disengage the locking-catches from the stump.

2. The combination, with a bevel-nosed stump adapted for attachment to the sill, of pivoted locking-catches carried by the sash, each of which is provided with an inclined shoulder, springs acting to throw said catches to the locked position, and a swinging finger-piece having inwardly-projecting lugs which engage said shoulders, and thereby disengage the catches from the stump.

3. The combination, with stump 4, having inclines 5 and 7, of pivoted locking-catches upon the sash having inclined shoulders, as shown, springs holding said catches in the locked position, a swinging finger-piece having inwardly-extending lugs adapted to engage said shoulders, a loosely-suspended spring locking-plate having upwardly-curved ends, which is tilted by the engagement therewith of incline 7 upon the stump, and means, substantially as described and shown, for moving said plate out of operative position.

4. The combination, with stump 4, having inclines 5 and 7, of pivoted locking-catches upon the sash having inclined shoulders, as shown, springs to hold said catches in the locked position, a swinging finger-piece having inwardly-extending lugs adapted to engage said shoulders, a loosely-suspended spring locking-plate having upwardly-curved ends, which is tilted by the engagement of incline 7, and a push-pin projecting through the case and engaging the upper end of said locking-plate, whereby said plate is pressed beyond the plane of the locking-catches to permit the latter to be disengaged from the stump by the movement of the finger-piece.

In testimony whereof I affix my signature in presence of two witnesses.

FERDINAND F. SCHUMANN.

Witnesses:
RICHARD SCHUMANN,
JESSE BAILY.